(12) United States Patent
Delson et al.

(10) Patent No.: US 12,730,881 B2
(45) Date of Patent: Sep. 8, 2026

(54) INTELLIGENT SEARCH ENGINE FOR DETECTING UNAUTHORIZED ACTIVITY

(71) Applicant: Bank of America Corporation, Charlotte, NC (US)

(72) Inventors: Kevin Delson, Woodland Hills, CA (US); Vijaya L. Vemireddy, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 240 days.

(21) Appl. No.: 18/212,455

(22) Filed: Jun. 21, 2023

(65) Prior Publication Data

US 2024/0427875 A1 Dec. 26, 2024

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ......................... G06F 21/552; G06F 2221/034
See application file for complete search history.

(56) References Cited

U.S. PATENT DOCUMENTS 10,693,872 B1 6/2020 Larson et al.
10,938,853 B1 3/2021 Zablocki et al.
11,329,998 B1 5/2022 Shahidzadeh et al.
11,531,780 B2 12/2022 Kundu et al.
11,757,914 B1 * 9/2023 Jakobsson ............... H04L 51/42 726/25
12,143,405 B2 * 11/2024 Chen Kaidi ........ H04L 63/1491
12,244,608 B2 * 3/2025 Palan .................. H04L 63/1475
2013/0293363 A1 * 11/2013 Plymouth ........... H04L 63/1425 340/309.16
2014/0230032 A1 8/2014 Duncan
2015/0205957 A1 7/2015 Turgeman et al.
2016/0086262 A1 3/2016 Straub et al.
2016/0180451 A1 6/2016 Visbal et al.
2016/0292405 A1 10/2016 Thomas et al.
2018/0034842 A1 * 2/2018 Smyth ................... G06F 21/577
2018/0114017 A1 4/2018 Leitner et al.
2018/0160309 A1 6/2018 Turgeman et al.
2019/0122149 A1 4/2019 Caldera et al.

(Continued)

*Primary Examiner* — Linglan Edwards
*Assistant Examiner* — Jacob Benedict Knackstedt
(74) *Attorney, Agent, or Firm* — Banner & Witcoff, Ltd.

(57) ABSTRACT

Arrangements for detecting unauthorized activity using artificial intelligence (AI)-driven searching are provided. In some aspects, input from a computing device associated with an entity may be received. A monitoring tool may be used to determine that the entity is a human entity. Responsive to determining that the entity is a human entity, one or more data sources may be queried for identity information related to the entity. Using an AI model, data from the received input may be compared with the identity information from the one or more data sources. Based on the comparison, a risk score associated with the entity may be assigned. The risk score may determine a presence of potential unauthorized activity associated with the entity. Feedback data on the risk score assigned by the AI model may be received. The AI model may be automatically and continuously updated based on the feedback data.

18 Claims, 9 Drawing Sheets

(56) References Cited

U.S. PATENT DOCUMENTS

2019/0141183 A1 5/2019 Chandrasekaran et al.
2019/0164173 A1 5/2019 Liu et al.
2019/0173893 A1* 6/2019 Muddu ............... H04L 63/1433
2020/0145436 A1 5/2020 Brown et al.
2021/0241120 A1 8/2021 Chen et al.
2022/0036488 A1* 2/2022 Brutsche ................ G06N 20/00
2022/0131844 A1 4/2022 Sherlock et al.
2022/0158982 A1 5/2022 Greene et al.
2023/0080885 A1 3/2023 Dalpini et al.
2023/0111621 A1 4/2023 Kumar et al.
2024/0236138 A1* 7/2024 Lamar ................. H04L 63/1433
2024/0281944 A1* 8/2024 Jayaraman ............. G06V 10/82
2024/0319990 A1* 9/2024 Li ............................. G06F 8/71
2024/0333699 A1* 10/2024 Narendranathan ..... H04L 63/08
2024/0364730 A1* 10/2024 Jones .................... H04L 63/083

* cited by examiner

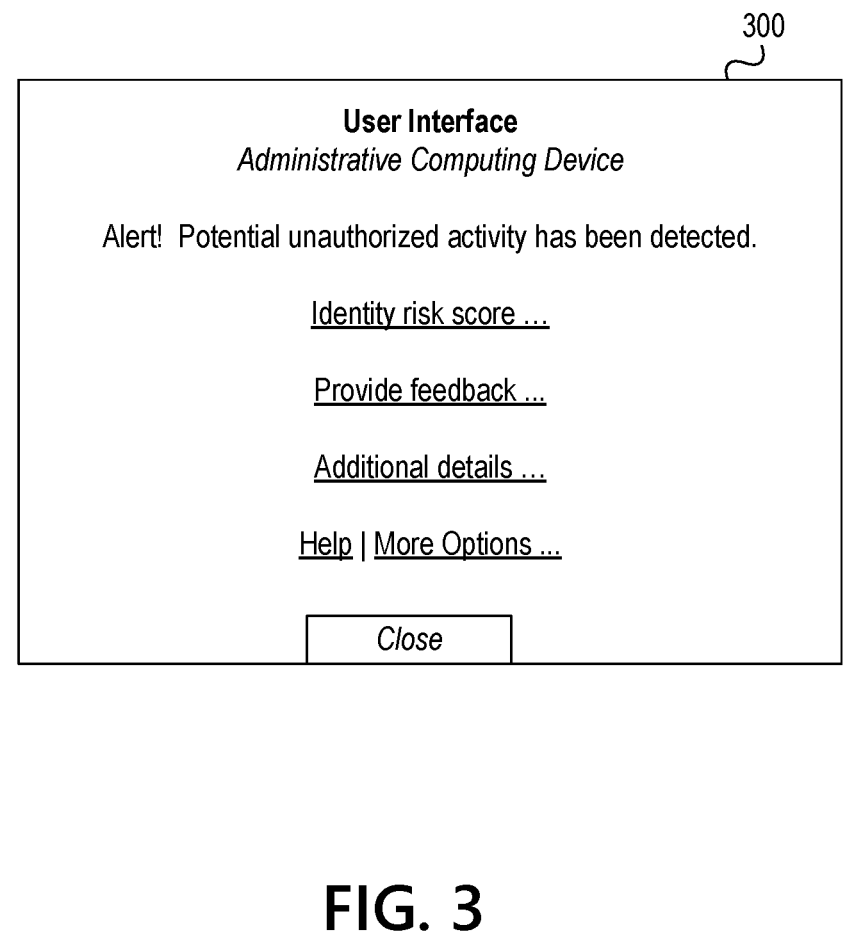

300

User Interface
*Administrative Computing Device*

Alert! Potential unauthorized activity has been detected.

Identity risk score ...

Provide feedback ...

Additional details ...

Help | More Options ...

*Close*

FIG. 3

INTELLIGENT SEARCH ENGINE FOR DETECTING UNAUTHORIZED ACTIVITY

BACKGROUND

Aspects of the disclosure generally relate to computer systems and networks. In particular, one or more aspects of the disclosure relate to an intelligent search engine for detecting unauthorized activity.

Unauthorized activity related to identities of users, particularly those involving synthetic identities, has gained traction. Synthetic identity schemes generally involve combining real or valid information from a user, with fictitious information or with valid information from another user, to establish a record under a new synthetic identity (e.g., using a number of different components that make up an identity) that might appear to represent a real person. Such schemes are typically attempted by human users or automated processes (e.g., bots). New synthetic identities are constantly being created, typically in increasing sophistication and complexity. Oftentimes it may be difficult to detect and prevent unauthorized activity relating to synthetic identities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with intelligently detecting unauthorized activity and synthetic identities.

In accordance with one or more embodiments, a computing platform having at least one processor, a communication interface, and memory may receive input from a computing device associated with an entity or individual. The computing platform may determine, using a monitoring tool, that the entity is a human entity. The computing platform may, responsive to determining that the entity is a human entity, query one or more data sources for identity information related to the entity. The computing platform may receive the identity information from the one or more data sources. The computing platform may compare, using an artificial intelligence model, data from the received input with the identity information from the one or more data sources. Based on the comparison, the computing platform may assign, using the artificial intelligence model, a risk score associated with the entity. In addition, the risk score may determine a presence of potential unauthorized activity associated with the entity. The computing platform may receive feedback data on the risk score assigned by the artificial intelligence model. The computing platform may automatically and continuously update, based on the feedback data, the artificial intelligence model.

In some aspects, comparing the data from the received input with the identity information from the one or more data sources may include: identifying a set of fact points about a known user; generating an authentication question based on the identified set of fact points about the known user, where the identified set of facts points about the known user constitutes a correct response to the authentication question; transmitting the authentication question to a computing device associated with the entity; receiving, from the computing device associated with the entity, response data responsive to the authentication question; comparing the response data to the set of fact points about the known user; and based on matching the set of fact points about the known user to the response data, authenticating the entity.

In some embodiments, the computing platform may retrieve a predetermined threshold, compare the risk score to the predetermined threshold, and based on the comparison, determine an occurrence of unauthorized activity associated with the entity when the risk score is above the predetermined threshold.

In some example arrangements, automatically and continuously updating the artificial intelligence model based on the feedback data may include adjusting the risk score assigned by the artificial intelligence model based on the feedback data.

In some embodiments, the one or more data sources may include historical data sources and publicly available data sources. In some arrangements, the one or more data sources may include social media data sources. In some examples, the one or more data sources may include financial institution data sources.

In some embodiments, determining that the entity is a human entity may include identifying an input speed associated with the received input.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an example graphical user interface for detecting unauthorized activity using AI-driven search functions in accordance with one or more arrangements discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to detecting unauthorized activity in user identification or identification generation using AI-driven searching. In particular, one or more aspects of the disclosure may, as an initial step, distinguish between human users and automated processes (e.g., bots). Subsequently, one or more aspects of the disclosure may provide an AI-driven search engine that drills down further to evaluate or identify the presence of potential unauthorized activity associated with human users. For example, the AI-driven search engine may be used to compare or cross-reference received data with historical data and publicly available (e.g., external) data to identify anomalies or other potential issues. Additionally or alternatively, the AI-driven search engine may be used to compare or cross-reference received data with private (e.g., internal) data. Further aspects of the disclosure may score the received data based on a result of the comparison. For instance, a social media profile that was created within the last few days may indicate potential unauthorized activity and have a higher score (e.g., indicating a higher level of risk) than a profile created several years earlier. Other data points may be similarly scored to evaluate potential unauthorized activity (e.g., address data, phone number data, etc.). These and various other arrangements will be discussed more fully below.

Figure 1A:
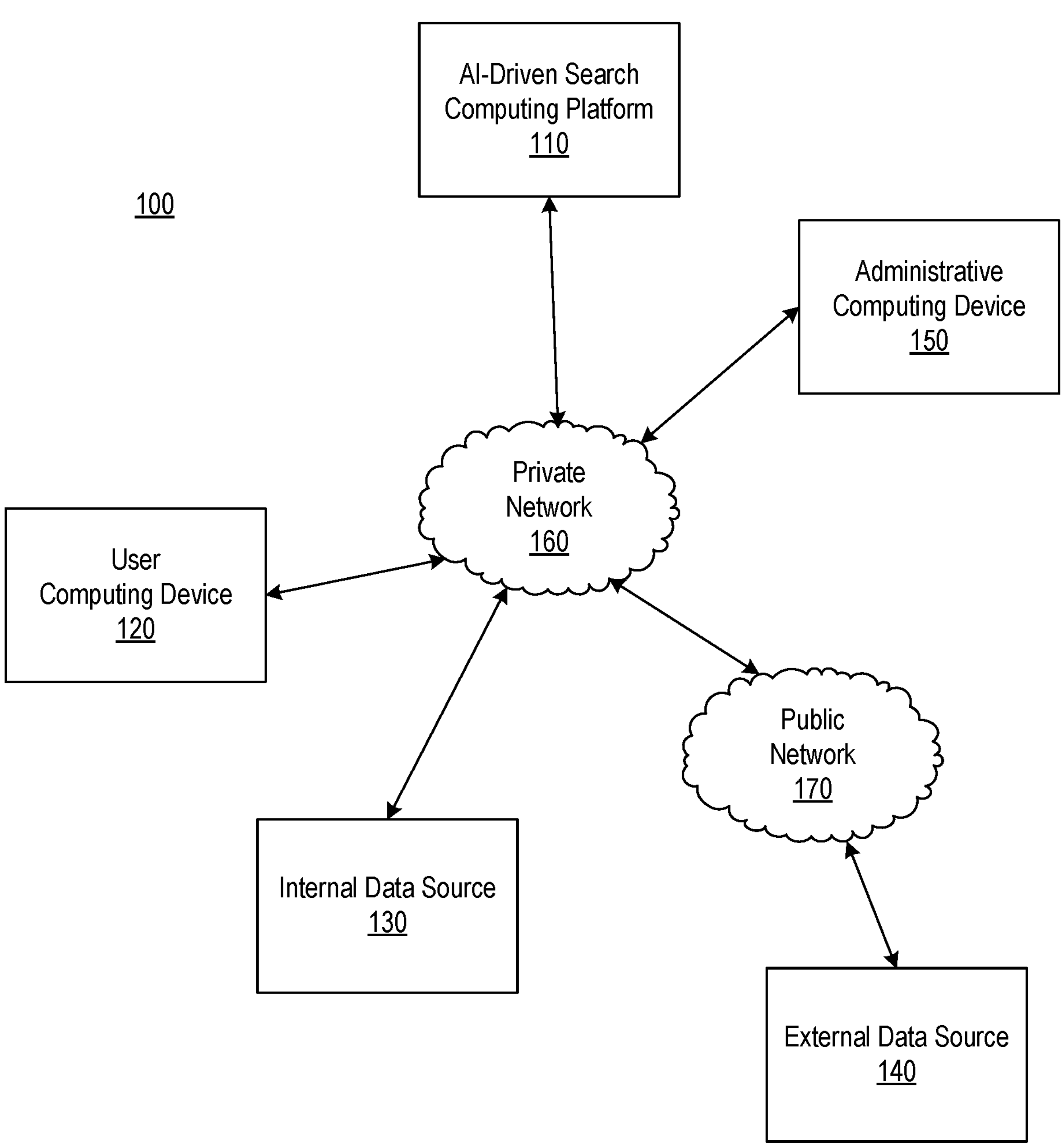
FIGS. 1A and 1B depict an illustrative computing environment for detecting unauthorized activity using AI-driven search functions in accordance with one or more arrangements discussed herein.
Figure 1B:
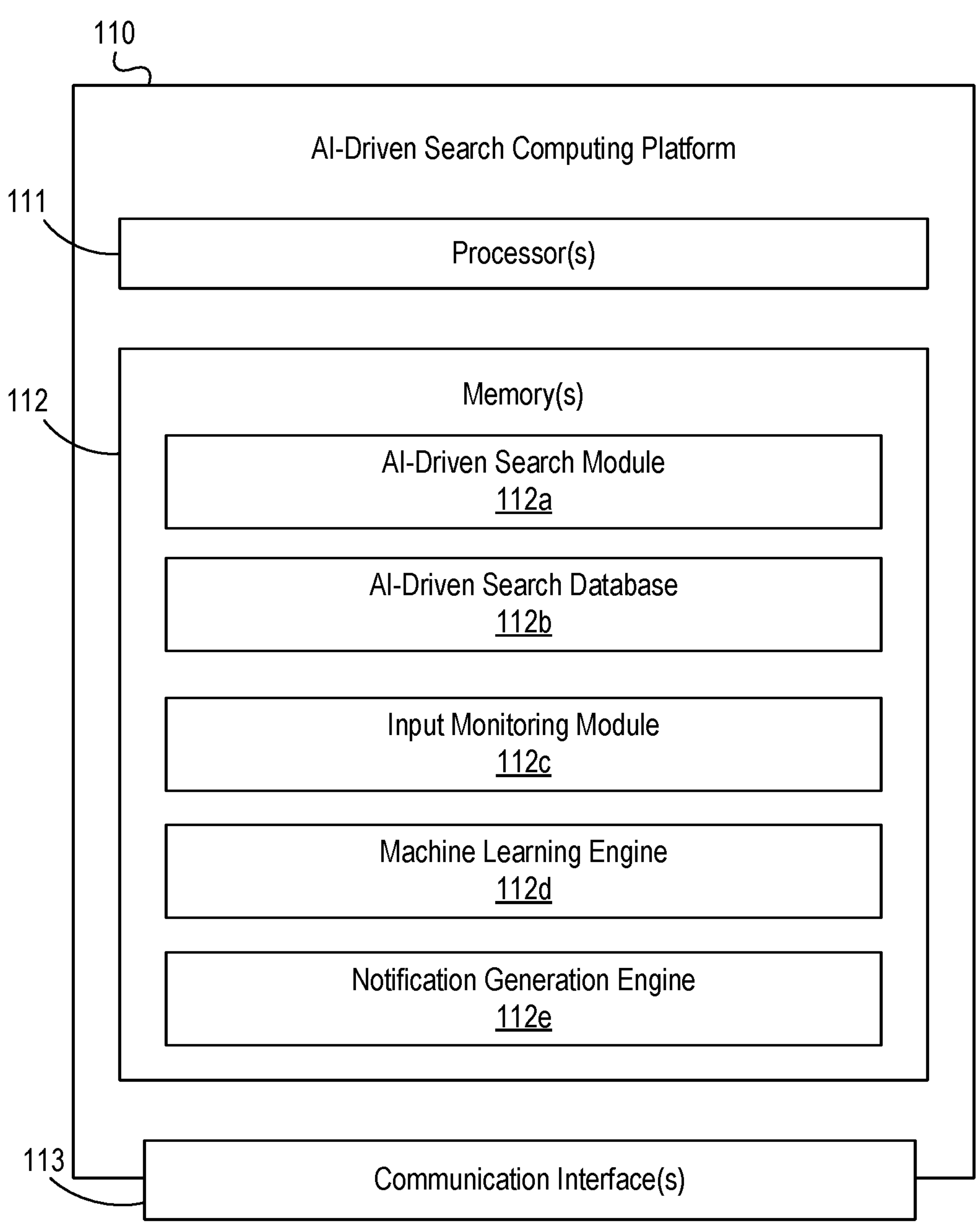

Aspects described herein may be implemented using one or more computing devices operating in a computing environment. For instance, FIGS. 1A and 1B depict an illustrative computing environment for detecting unauthorized activity relating to user identities or identity generation in accordance with one or more example arrangements. Referring to FIG. 1A, computing environment 100 may include one or more computing devices and/or other computing systems. For example, computing environment 100 may include AI-driven search computing platform 110, user computing device 120, internal data source 130, external data source 140, and administrative computing device 150. In some examples, computing environment 100 may be a distributed computing environment such as a cloud computing environment. Although one user computing device 120, one internal data source 130, one external data source 140, and one administrative computing device 150 are shown, any number of devices or data sources may be used without departing from the disclosure.

As described further below, AI-driven search computing platform 110 may include one or more computing devices configured to perform one or more of the functions described herein. For example, AI-driven search computing platform 110 may include one or more computer systems, servers, server blades, or the like. In one or more instances, AI-driven search computing platform 110 may be configured to host and/or otherwise maintain one or more machine learning models that may be used in performing AI-driven search and/or one or more other functions described herein. Among other functions, AI-driven search computing platform 110 may distinguish between humans and bots as an initial step in identifying potential unauthorized activity, and further evaluate the potential unauthorized activity based on leveraging an artificial intelligence-based search engine to cross-reference received data with historical data, public (e.g., external) data, and/or private (e.g., internal) data. In some instances, AI-driven search computing platform 110 may be configured to dynamically tune machine learning models and/or algorithms as additional data is received, detected, or analyzed.

User computing device 120 may be or include one or more computing devices and/or other computer components (e.g., processors, memories, communication interfaces). For example, user computing device 120 may be a desktop computing device (e.g., desktop computer, terminal), or the like or a mobile computing device (e.g., smartphone, tablet, smart watch, laptop computer, or the like) used by users interacting with AI-driven search computing platform 110.

Internal data source 130 may be or include one or more computing devices (e.g., servers, server blades, or the like) that may be used to host internal user/customer data relating to an enterprise organization maintaining the internal data source 130. For example, the enterprise organization may be a financial institution, or the like, and the internal data source 130 may be configured to host biometrics information, personally identifiable information, user account information, prior interaction data (e.g., including timestamp data), or the like. In some instances, the private network 160 may include one or more internal data sources similar to internal data source 130.

External data source 140 may be or include one or more computing devices (e.g., servers, server blades, or the like) that may be used to host external customer data (e.g., for other enterprise organizations). For example, the external data source 140 may be configured to host social media data, geospatial/location data, web or internet data, employment data, electronic mail data, real estate records, motor vehicle records, business or corporate registrations, or the like. In some instances, the public network 170 may include one or more external data sources similar to external data source 140.

Administrative computing device 150 may be or include one or more computing devices and/or other computer components (e.g., processors, memories, communication interfaces) used to manage the AI-driven search computing platform 110. For instance, administrative computing device 150 may be a server, desktop computer, laptop computer, tablet, mobile device, or the like, and may be associated with an enterprise organization operating AI-driven search computing platform 110. In some examples, administrative computing device 150 may be used by security personnel internal to an organization to provide feedback (e.g., used to train, update, and/or validate an AI model).

Computing environment 100 also may include one or more networks, which may interconnect one or more of AI-driven search computing platform 110, user computing device 120, internal data source 130, external data source 140, and administrative computing device 150. For example, computing environment 100 may include private network 160 and public network 170. Private network 160 and/or public network 170 may include one or more sub-networks (e.g., local area networks (LANs), wide area networks (WANs), or the like).

Private network 160 may be associated with a particular organization (e.g., a corporation, financial institution, educational institution, governmental institution, or the like) and may interconnect one or more computing devices associated with the organization. For example, AI-driven search computing platform 110, user computing device 120, internal data source 130, and administrative computing device 150 may be associated with an organization (e.g., a financial institution), and private network 160 may be associated with and/or operated by the organization, and may include one or more networks (e.g., LANs, WANs, virtual private networks (VPNs), or the like) that interconnect AI-driven search computing platform 110, user computing device 120, internal data source 130, and administrative computing device

150 and one or more other computing devices and/or computer systems that are used by, operated by, and/or otherwise associated with the organization.

Public network 170 may connect private network 160 and/or one or more computing devices connected thereto (e.g., AI-driven search computing platform 110, user computing device 120, internal data source 130, and administrative computing device 150) with one or more networks and/or computing devices that are not associated with the organization. For example, external data source 140 might not be associated with an organization that operates private network 160, and public network 170 may include one or more networks (e.g., the Internet) that connect external data source 140 to private network 160 and/or one or more computing devices connected thereto (e.g., AI-driven search computing platform 110, user computing device 120, internal data source 130, and administrative computing device 150).

In one or more arrangements, AI-driven search computing platform 110, user computing device 120, internal data source 130, external data source 140, and administrative computing device 150 may be any type of computing device capable of identifying potential unauthorized activity in user identification or identification generation. For example, AI-driven search computing platform 110, user computing device 120, internal data source 130, external data source 140, administrative computing device 150, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, AI-driven search computing platform 110 may include one or more processors 111, memory 112, and communication interface 113. A data bus may interconnect processor(s) 111, memory 112, and communication interface 113. Communication interface 113 may be a network interface configured to support communication between AI-driven search computing platform 110 and one or more networks (e.g., private network 160, public network 170, or the like). Memory 112 may include one or more program modules having instructions that when executed by processor(s) 111 cause AI-driven search computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of AI-driven search computing platform 110 and/or by different computing devices that may form and/or otherwise make up AI-driven search computing platform 110.

For example, memory 112 may have, store and/or include an AI-driven search module 112*a*, an AI-driven search database 112*b*, an input monitoring module 112*c*, a machine learning engine 112*d*, and a notification generation engine 112*e*. AI-driven search module 112*a*, may have instructions that direct and/or cause AI-driven search computing platform 110 to, for instance, learn to distinguish between humans and bots as an initial step in identifying potential unauthorized activity, and subsequently learn to identify the presence of potential unauthorized activity, leveraging historical data, public (e.g., external) data, and/or private (e.g., internal) data, and/or instructions that direct AI-driven search computing platform 110 to perform other functions, as discussed in greater detail below. AI-driven search database 112*b* may store information used by AI-driven search module 112*a* and/or AI-driven search computing platform 110 in performing AI-driven search and/or in performing other functions, as discussed in greater detail below.

AI-driven search computing platform 110 may further have, store and/or include an input monitoring module 112*c* (e.g., input monitoring tool). Input monitoring module 112*c* may store instructions and/or data that may cause or enable AI-driven search computing platform 110 to monitor and analyze input methods for distinguishing between human and bot inputs. For example, input monitoring module 112*c* may monitor behavioral differences between humans and bots with respect to typing speed, mouse click speed, mouse movements, typing rhythm, speech patterns, or the like.

AI-driven search computing platform 110 may further have, store and/or include a machine learning engine 112*d*. Machine learning engine 112*d* may use artificial intelligence/machine learning (AI/ML) algorithms to derive rules and identify patterns and anomalies associated with received data/input. In some examples, the AI/ML algorithm may include natural language processing (NLP), abstract syntax trees (ASTs), clustering, and/or the like. Machine learning engine 112*d* may have instructions that direct and/or cause AI-driven search computing platform 110 to set, define, and/or iteratively redefine rules, techniques and/or other parameters used by AI-driven search computing platform 110 and/or other systems in computing environment 100 in distinguishing between human users and bots as an initial step, and conducting further searching and learning associated with human users to identify potential unauthorized activity in user identification or identification generation, leveraging data from private/internal and public/external databases or data lakes. In some examples, AI-driven search computing platform 110 may build and/or train one or more machine learning models. For example, memory 112 may have, store, and/or include historical/training data. In some examples, AI-driven search computing platform 110 may receive historical and/or training data and use that data to train one or more machine learning models stored in machine learning engine 112*d*. The historical and/or training data may include, for instance, historical interaction data, historical transaction data, historical banking data, historical identity record data, and/or the like. The data may be gathered and used to build and train one or more machine learning models executed by machine learning engine 112*d* to identify one or more occurrences of potential unauthorized activity in user identification or identification generation, including determining whether the user/data should be flagged for investigation (e.g., for potential anomalous or unauthorized activity), and/or perform other functions, as discussed in greater detail below. Various machine learning algorithms may be used without departing from the disclosure, such as supervised learning algorithms, unsupervised learning algorithms, abstract syntax tree algorithms, natural language processing algorithms, clustering algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, artificial neural network algorithms, and the like. Additional or alternative machine learning algorithms may be used without departing from the disclosure.

AI-driven search computing platform 110 may further have, store and/or include a notification generation engine 112*e*. Notification generation engine 112*e* may store instructions and/or data that may cause or enable AI-driven search computing platform 110 to send, to another computing device (e.g., administrative computing device 150), notifications or results related to detection of potential anomalous or unauthorized activity. In some examples, if feedback data is requested, the notification generation module 112*e* may generate a notification (e.g., to administrative computing device 150) requesting feedback data (e.g., regarding accuracy of an AI model).

FIGS. 2A-2E depict one example illustrative event sequence for detecting unauthorized or malicious activity using AI-driven search in accordance with one or more aspects described herein. The events shown in the illustrative event sequence are merely one example sequence and additional events may be added, or events may be omitted, without departing from the disclosure. Further, one or more processes discussed with respect to FIGS. 2A-2E may be performed in real-time or near real-time.

Figure 2A:
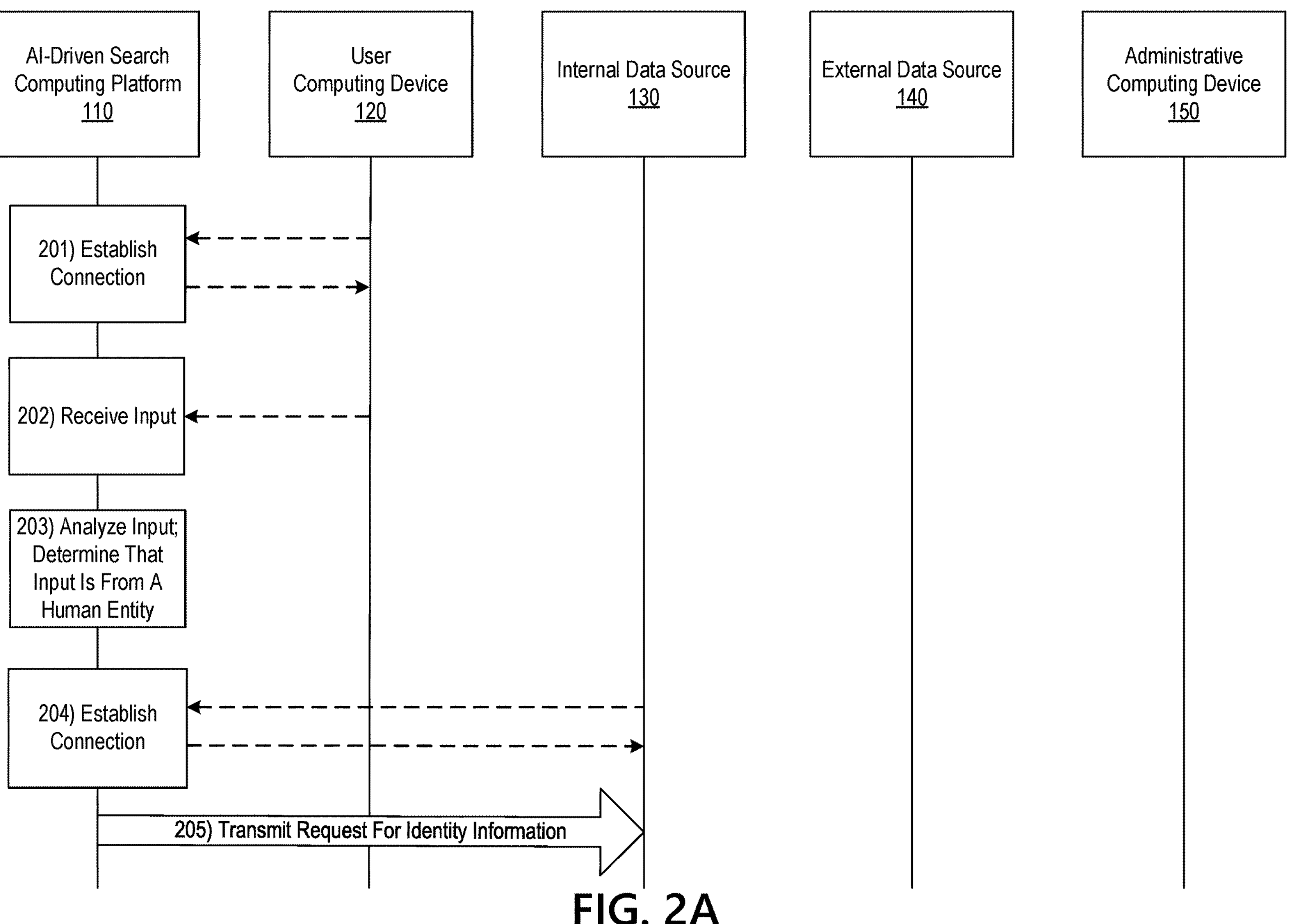
FIGS. 2A-2E depict an illustrative event sequence for detecting unauthorized activity using AI-driven search functions in accordance with one or more arrangements discussed herein.

With reference to FIG. 2A, at step 201, user computing device 120 may connect to AI-driven search computing platform 110. For instance, a first wireless connection may be established between user computing device 120 and AI-driven search computing platform 110. Upon establishing the first wireless connection, a communication session may be initiated between user computing device 120 and AI-driven search computing platform 110.

At step 202, AI-driven search computing platform 110 may receive input from a computing device associated with an entity or individual (e.g., user computing device 120). In some examples, the received input may be and/or include a keyboard input, mouse input, voice input, touchpad input, pen or stylus input, or the like.

At step 203, AI-driven search computing platform 110 may (e.g., via input monitoring module 112*c*) analyze the input method and determine whether the entity is a human entity (e.g., a real person). For instance, in making this determination, AI-driven search computing platform 110 may examine data entry patterns such as identifying an input speed associated with the received input (e.g., typing speed, mouse click speed, etc.). Additionally or alternatively, AI-driven search computing platform 110 may identify a cadence or pace of communication (e.g., analyzing mouse movements, analyzing a typing rhythm). For instance, human users behave more imperfectly or erratically (e.g., take more time, shift behavior more often) than automated processes (e.g., bots).

Responsive to determining that the entity is a human entity, AI-driven search computing platform 110 may drill down further to receive more information associated with potential unauthorized activity. For example, at steps 204 through 213, as discussed more fully herein, AI-driven search computing platform 110 may query or search one or more data sources or repositories (e.g., internal data source 130, external data source 140) for identity information related to the entity. In some examples, the one or more data sources may include historical data sources, publicly available (e.g., external) data sources, private (e.g., internal) data sources, and/or data lakes. In addition, the one or more data sources may include bank data sources (e.g., sources of data associated with a financial institution) and non-bank data sources (e.g., sources of data not associated with a financial institution). In some examples, the one or more data sources may include current internet data such as social media data (e.g., data associated with social networking sites or accounts).

For example, at step 204, AI-driven search computing platform 110 may connect to internal data source 130. For instance, a second wireless connection may be established between AI-driven search computing platform 110 and internal data source 130. Upon establishing the second wireless connection, a communication session may be initiated between AI-driven search computing platform 110 and internal data source 130. At step 205, AI-driven search computing platform 110 may transmit a request, to a first data source (e.g., to internal data source 130), for the identity information.

Figure 2B:
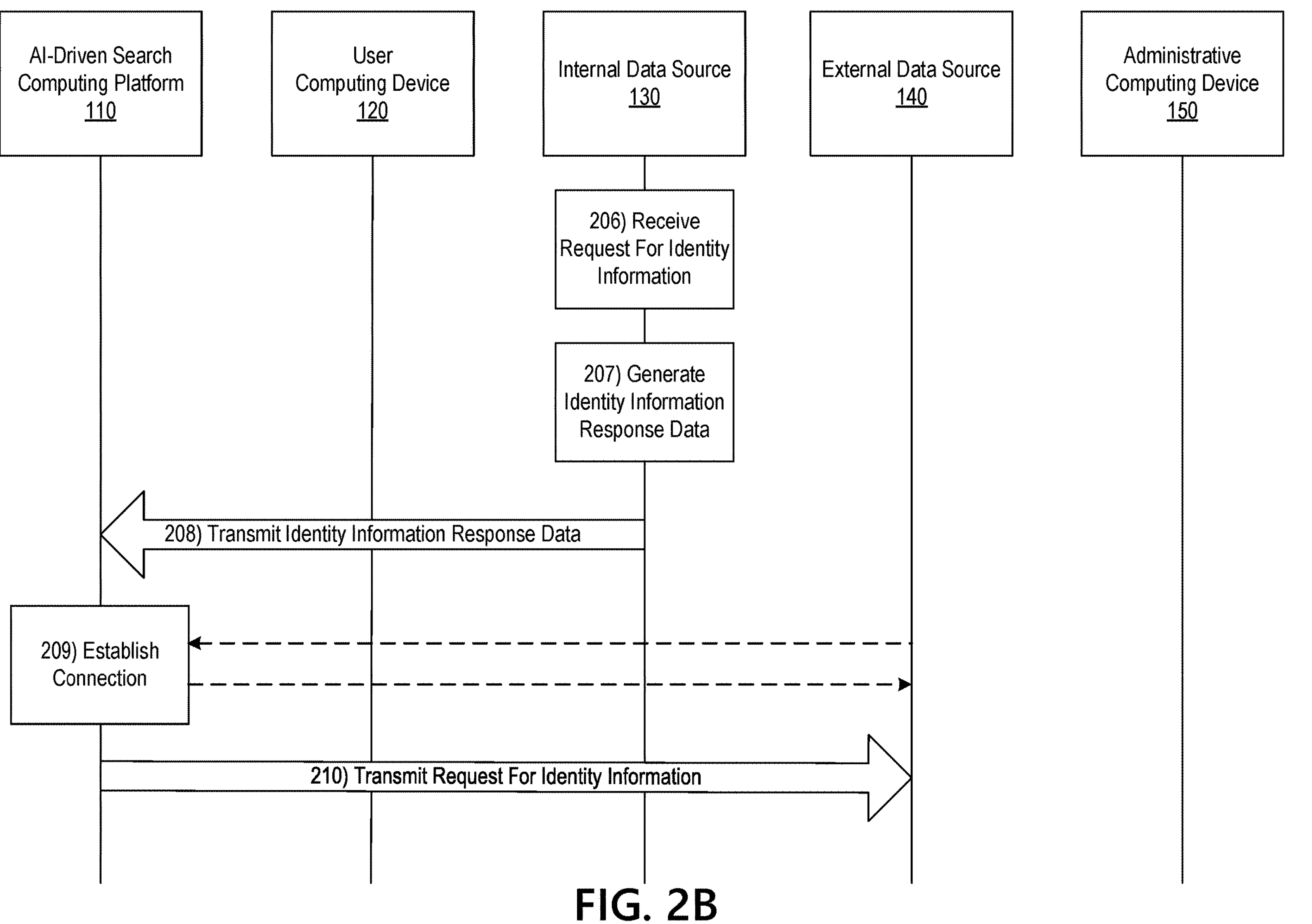

With reference to FIG. 2B, at step 206, internal data source 130 may receive the request for the identity information. In response, at step 207, identity information response data may be generated. At step 208, internal data source 130 may transmit the identity information response data to AI-driven search computing platform 110.

Additionally or alternatively, at step 209, AI-driven search computing platform 110 may connect to external data source 140. For instance, a third wireless connection may be established between AI-driven search computing platform 110 and external data source 140. Upon establishing the third wireless connection, a communication session may be initiated between AI-driven search computing platform 110 and external data source 140. At step 210, AI-driven search computing platform 110 may transmit a request, to a second data source (e.g., to external data source 140), for the identity information.

Figure 2C:
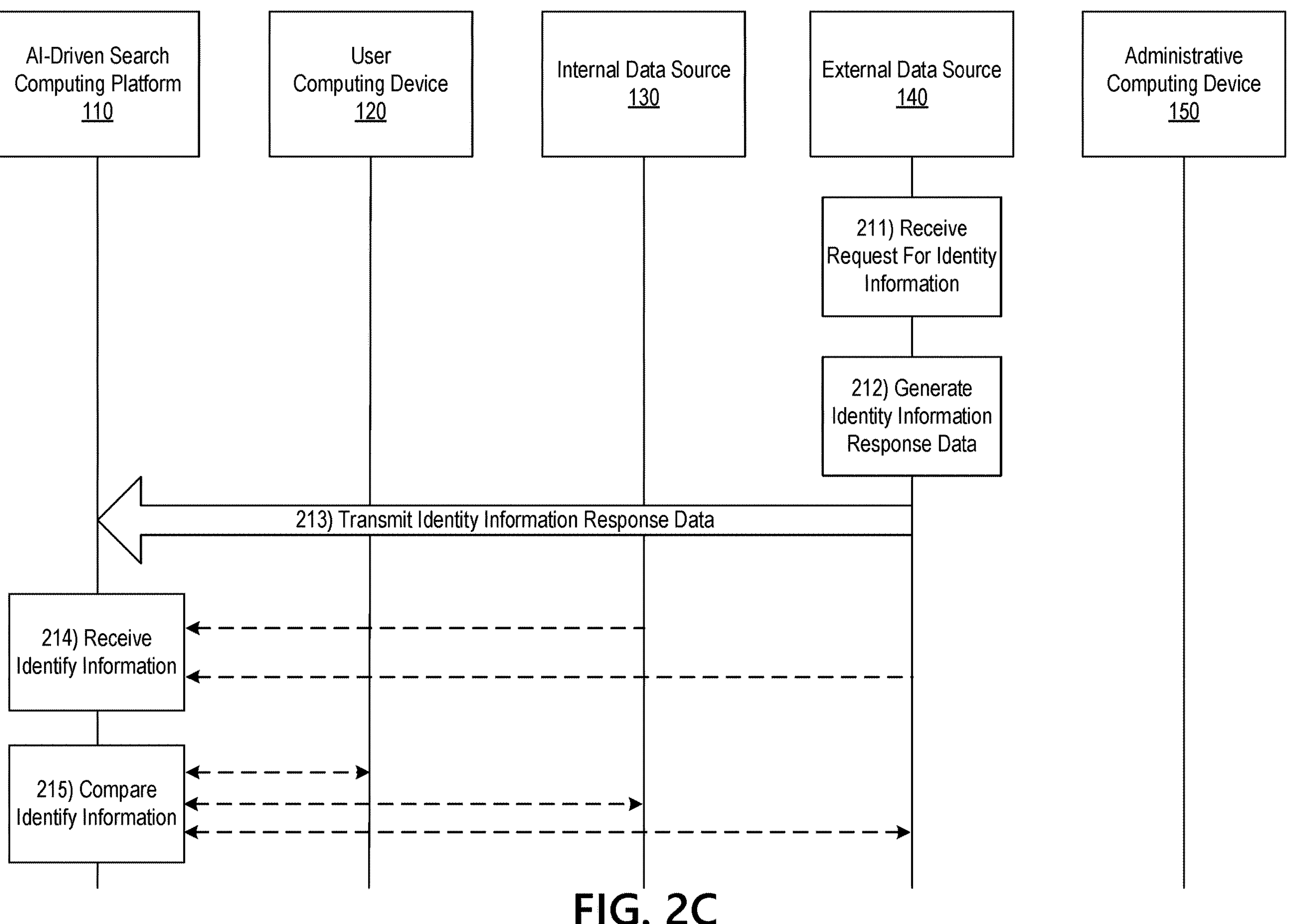

With reference to FIG. 2C, at step 211, external data source 140 may receive the request for the identity information. In response, at step 212, identity information response data may be generated. At step 213, external data source 140 may transmit the identity information to AI-driven search computing platform 110.

At step 214, AI-driven search computing platform 110 may receive the identity information response data from the one or more data sources (e.g., internal data source 130, external data source 140). At step 215, AI-driven search computing platform 110 may compare, using an artificial intelligence model, data from the received input with the identity information response data from the one or more data sources (e.g., internal data source 130, external data source 140). In one non-limiting example, AI-driven search computing platform 110 may identify a set of fact points about a known user and generate an authentication question based on the identified set of fact points about the known user. In addition, the identified set of facts points about the known user may include a correct response to the authentication question. AI-driven search computing platform 110 may transmit the authentication question to a computing device associated with the entity and receive, from the computing device associated with the entity, response data responsive to the authentication question. AI-driven search computing platform 110 may compare the response data to the set of fact points about the known user. Based on matching the set of fact points about the known user to the response data (e.g., above/greater than or equal to a predetermined threshold), AI-driven search computing platform 110 may authenticate the entity (e.g., the entity is actually who they say they are). Based on only some of the response data matching up to the set of fact points about the known user (e.g., below/less than the predetermined threshold), driven search computing platform 110 may identify the anomaly (e.g., outlier) in the data, indicating a presence of potential unauthorized activity.

Figure 2D:
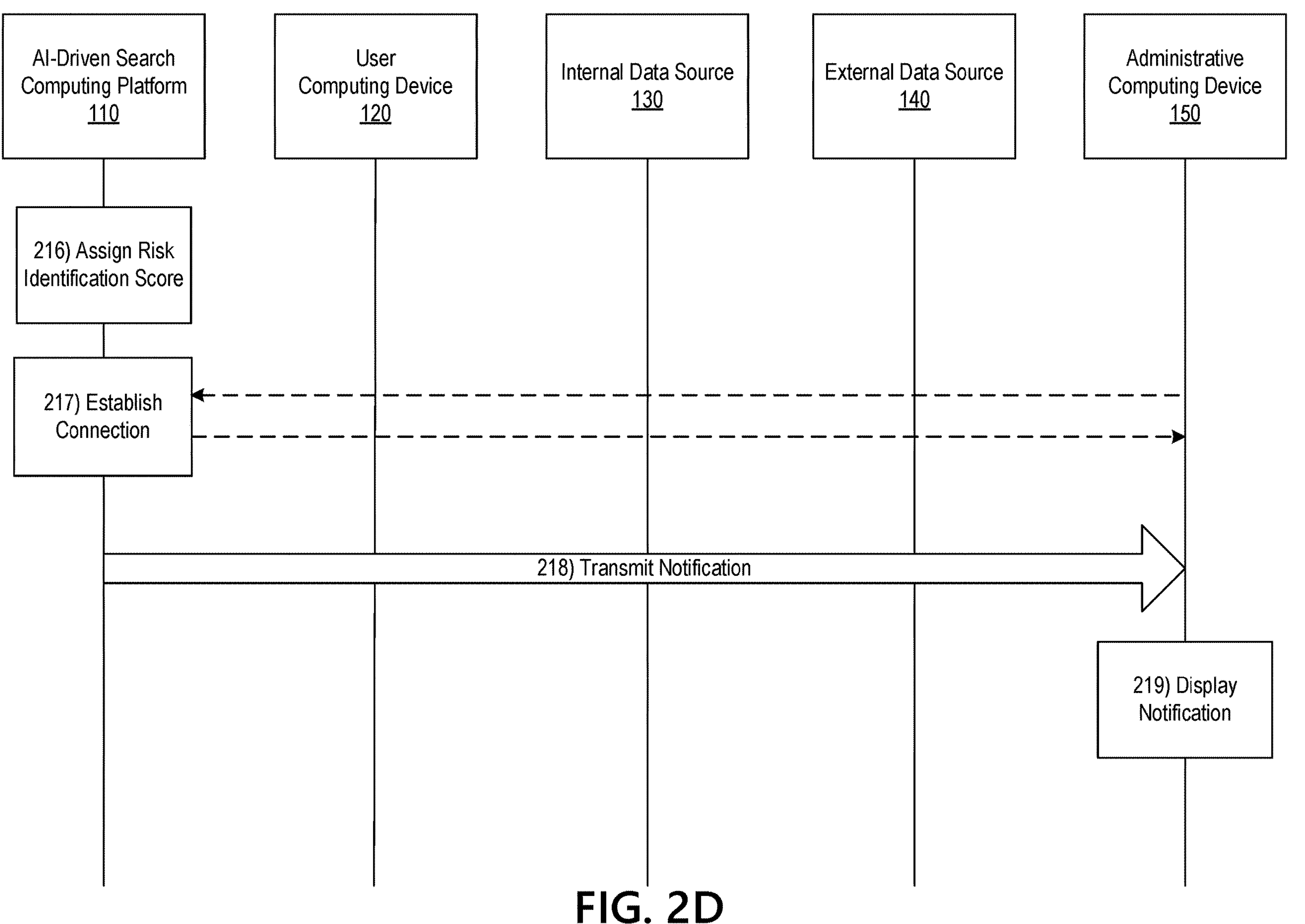

With reference to FIG. 2D, at step 216, AI-driven search computing platform 110 may assign a risk score/level or a risk identification profile associated with the entity using the artificial intelligence model. In some examples, the risk score (e.g., identity risk score) may determine or predict a presence of potential unauthorized activity associated with the entity. For instance, the risk score/level may be a score between zero to one hundred, where a low score may indicate a low level of risk of potential unauthorized activity, while a high score may indicate a high level of risk of potential unauthorized activity. In some examples, AI-driven search computing platform 110 may retrieve or determine a predetermined threshold, compare the risk score to the predetermined threshold, and based on the comparison, determine an occurrence of unauthorized activity associated with the entity when the risk score is above (e.g., greater than) or equal to the predetermined threshold. In some examples, the predetermined threshold may be set by an administrative user, as a default or adjustable variable.

At step 217, AI-driven search computing platform 110 may connect to administrative computing device 150. For instance, a fourth wireless connection may be established between AI-driven search computing platform 110 and administrative computing device 150. Upon establishing the fourth wireless connection, a communication session may be initiated between AI-driven search computing platform 110 and administrative computing device 150.

At step 218, AI-driven search computing platform 110 may transmit (e.g., via notification generation engine 112*e*), via the communication interface (e.g., communication interface 113), one or more notifications or alerts (e.g., to administrative computing device 150) based on the score. For instance, the administrative computing device (e.g., administrative computing device 150) may display and/or otherwise present one or more graphical user interfaces similar to graphical user interface 300, which is illustrated in FIG. 3. As shown in FIG. 3, graphical user interface 300 may include text and/or other information associated with an alert or notification (e.g., "Alert! Potential unauthorized activity has been detected. [Identity risk score . . . ] [Provide feedback . . . ] [Additional details . . . ]"). It will be appreciated that other and/or different notifications may also be provided. Returning to FIG. 2D, at step 219, the administrative computing device (e.g., administrative computing device 150) may receive and display the notification or alert. It will be appreciated that other and/or different notifications may also be provided.

Figure 2E:
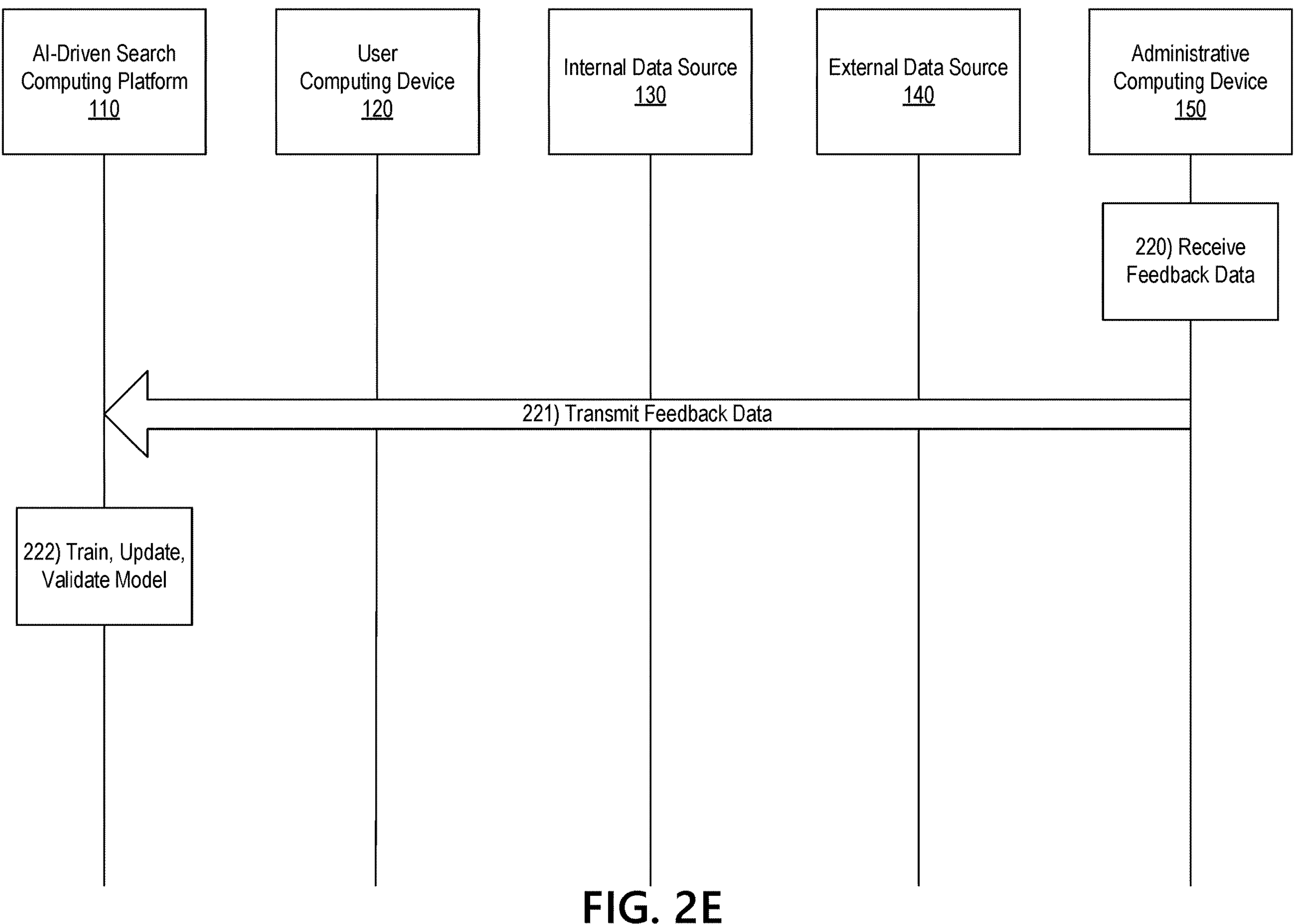

Referring to FIG. 2E, at step 220, administrative computing device 150 may receive feedback data on the risk score assigned by the artificial intelligence model (e.g., at step 216). For example, the feedback data may evaluate an accuracy of the artificial intelligence model. At step 221, administrative computing device 150 may transmit the feedback data to AI-driven search computing platform 110.

At step 222, AI-driven search computing platform 110 may automatically and continuously update the artificial intelligence model based on the feedback data. In some examples, AI-driven search computing platform 110 may adjust the risk score assigned by the artificial intelligence model based on the feedback data, thereby, through this further search and learning, continuously improve the accuracy of predictions relating to the presence of unauthorized activity.

Figure 4:
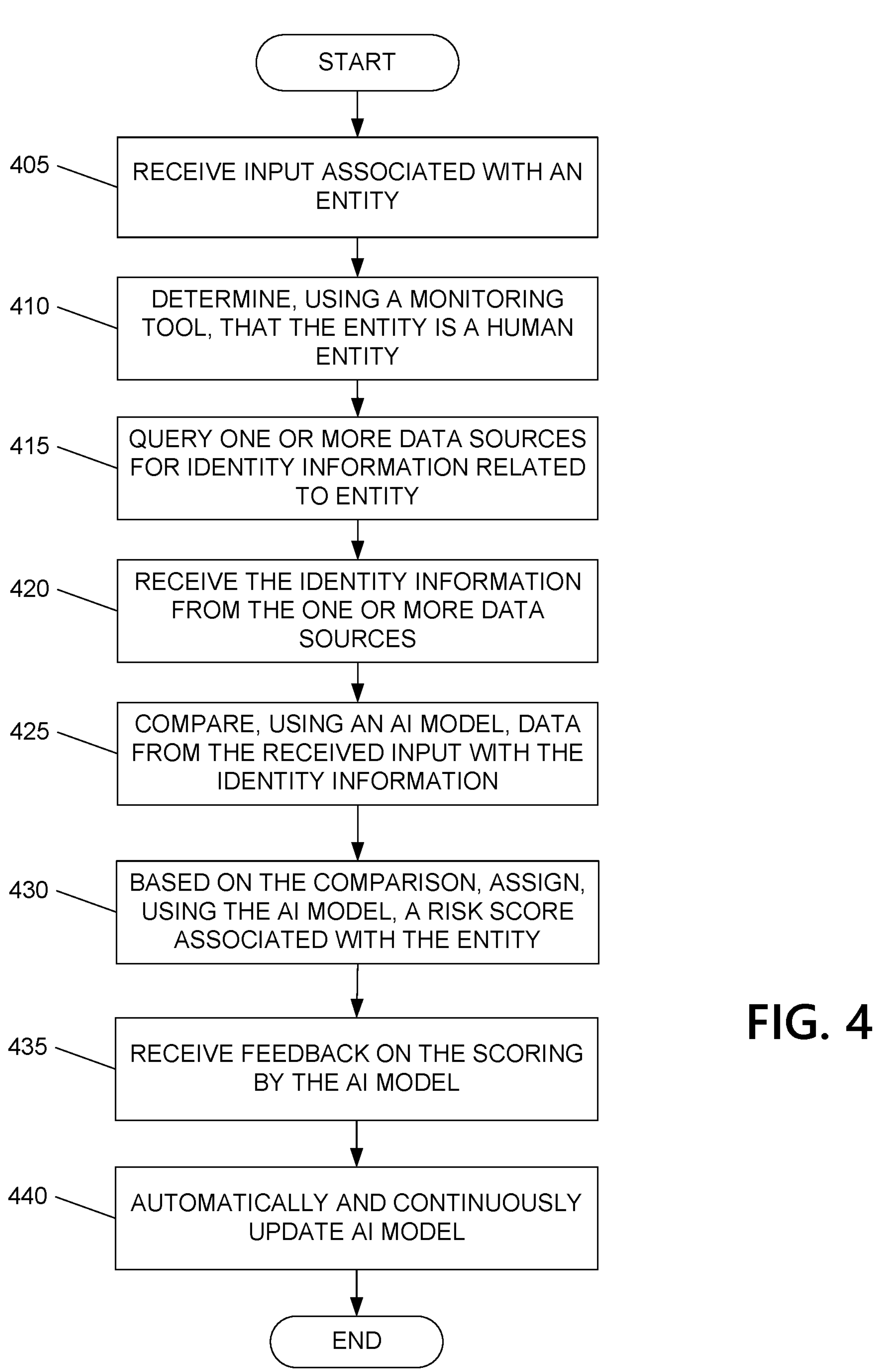
FIG. 4 depicts an illustrative method for detecting unauthorized activity using AI-driven search functions in accordance with one or more arrangements discussed herein.

FIG. 4 depicts an illustrative method for detecting unauthorized activity using AI-driven searching in accordance with one or more example embodiments. With reference to FIG. 4, at step 405, a computing platform having at least one processor, a communication interface, and memory may receive input from a computing device associated with an entity. At step 410, the computing platform may determine, using a monitoring tool, that the entity is a human entity. At step 415, responsive to determining that the entity is a human entity, the computing platform may query one or more data sources for identity information related to the entity. At step 420, the computing platform may receive the identity information from the one or more data sources. At step 425, the computing platform may compare, using an artificial intelligence model, data from the received input with the identity information from the one or more data sources. At step 430, based on the comparison, the computing platform may assign, using the artificial intelligence model, a risk score associated with the entity. In addition, the risk score may determine a presence of potential unauthorized activity associated with the entity. At step 435, the computing platform may receive feedback data on the risk score assigned by the artificial intelligence model. At step 440, the computing platform may automatically and continuously update, based on the feedback data, the artificial intelligence model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

receive input from a computing device associated with an entity;

determine, using a monitoring tool, that the entity is a human entity;

responsive to determining that the entity is a human entity, query one or more data sources for identity information related to the entity, wherein the one or more data sources comprise financial institution data sources, wherein the financial institution data sources include biometric information, personally identifiable information, user account information, and prior interaction data wherein the prior interaction data comprises timestamp data, and wherein the one or more data sources further comprise a known user typing speed, mouse click speed, mouse movements, typing rhythm, and speech patterns;

receive the identity information from the one or more data sources;

compare, using an artificial intelligence model, data from the received input with the identity information from the one or more data sources, wherein comparing the data from the received input with the identity information from the one or more data sources further comprises:

identifying, via the artificial intelligence model, a set of fact points about the known user, generating, via the artificial intelligence model using the identified set of fact points about the known user, an authentication question, wherein the identified set of facts points about the known user constitutes a correct response to the authentication question;

based on the comparison, assign, using the artificial intelligence model, a risk score associated with the entity, wherein the risk score determines a presence of potential unauthorized activity associated with the entity;

receive feedback data on the risk score assigned by the artificial intelligence model;

automatically and continuously update, based on the feedback data, the artificial intelligence model;

transmitting a notification of the presence of potential unauthorized activity associated with the entity; and displaying, via the computing platform and a user interface, a display notification of the presence of potential unauthorized activity associated with the entity, wherein the user interface further displays an alert including information associated with the alert, the risk score associated with the entity, a provide feedback option, and an additional details option.

2. The computing platform of claim 1, wherein comparing, using the artificial intelligence model, the data from the received input with the identity information from the one or more data sources further comprises:

transmitting the authentication question to a computing device associated with the entity;

receiving, from the computing device associated with the entity, response data responsive to the authentication question;

comparing the response data to the set of fact points about the known user; and based on matching the set of fact points about the known user to the response data, authenticating the entity.

3. The computing platform of claim 1, further including instructions that, when executed, cause the computing platform to:

retrieve a predetermined threshold;

compare the risk score to the predetermined threshold; and based on the comparison, determine an occurrence of unauthorized activity associated with the entity when the risk score is above the predetermined threshold.

4. The computing platform of claim 1, wherein automatically and continuously updating the artificial intelligence model based on the feedback data comprises adjusting the risk score assigned by the artificial intelligence model based on the feedback data.

5. The computing platform of claim 1, wherein the one or more data sources comprise historical data sources and publicly available data sources.

6. The computing platform of claim 1, wherein the one or more data sources comprise social media data sources.

7. The computing platform of claim 1, wherein determining that the entity is a human entity includes identifying an input speed associated with the received input.

8. A method, comprising:

at a computing platform comprising at least one processor, a communication interface, and memory:

receiving, by the at least one processor, input from a computing device associated with an entity;

determining, by the at least one processor, that the entity is a human entity;

responsive to determining that the entity is a human entity, querying, by the at least one processor, one or more data sources for identity information related to the entity;

receiving, by the at least one processor, the identity information from the one or more data sources, wherein the one or more data sources comprise financial institution data sources, wherein the financial institution data sources include biometric information, personally identifiable information, user account information, and prior interaction data wherein the prior interaction data comprises timestamp data, and wherein the one or more data sources further comprise a known user typing speed, mouse click speed, mouse movements, typing rhythm, and speech patterns;

comparing, by the at least one processor, using an artificial intelligence model, data from the received input with the identity information from the one or more data sources, wherein comparing the data from the received input with the identity information from the one or more data sources further comprises:

identifying, by the at least one processor, using the artificial intelligence model, a set of fact points about a known user, generating, by the at least one processor, using the artificial intelligence model using the identified set of fact points about the known user, an authentication question, wherein the identified set of facts points about the known user constitutes a correct response to the authentication question;

based on the comparison, assigning, by the at least one processor, using the artificial intelligence model, a risk score associated with the entity, wherein the risk score determines a presence of potential unauthorized activity associated with the entity;

receiving, by the at least one processor, feedback data on the risk score assigned by the artificial intelligence model; and automatically and continuously updating, by the at least one processor, based on the feedback data, the artificial intelligence model.

9. The method of claim 8, wherein comparing, using the artificial intelligence model, the data from the received input with the identity information from the one or more data sources further comprises:

transmitting, by the at least one processor, the authentication question to a computing device associated with the entity;

receiving, by the at least one processor, from the computing device associated with the entity, response data responsive to the authentication question;

comparing, by the at least one processor, the response data to the set of fact points about the known user; and based on matching the set of fact points about the known user to the response data, authenticating, by the at least one processor, the entity.

10. The method of claim 8, further comprising:

retrieving, by the at least one processor, a predetermined threshold;

comparing, by the at least one processor, the risk score to the predetermined threshold; and based on the comparison, determining, by the at least one processor, an occurrence of unauthorized activity associated with the entity when the risk score is above the predetermined threshold.

11. The method of claim 8, wherein automatically and continuously updating the artificial intelligence model based on the feedback data comprises adjusting the risk score assigned by the artificial intelligence model based on the feedback data.

12. The method of claim 8, wherein the one or more data sources comprises historical data sources and publicly available data sources.

13. The method of claim 8, wherein the one or more data sources comprises social media data sources.

14. The method of claim 8, wherein determining that the entity is a human entity comprises identifying an input speed associated with the received input.

15. One or more non-transitory computer-readable media storing instructions that, when executed by a computing platform comprising at least one processor, memory, and a communication interface, cause the computing platform to:

receive input from a computing device associated with an entity;

determine, using a monitoring tool, that the entity is a human entity;

responsive to determining that the entity is a human entity, query one or more data sources for identity information related to the entity, wherein the one or more data sources comprise financial institution data sources, wherein the financial institution data sources include biometric information, personally identifiable information, user account information, and prior interaction data wherein the prior interaction data comprises timestamp data, and wherein the one or more data sources further comprise a known user typing speed, mouse click speed, mouse movements, typing rhythm, and speech patterns;

receive the identity information from the one or more data sources;

compare, using an artificial intelligence model, data from the received input with the identity information from the one or more data sources, wherein comparing the data from the received input with the identity information from the one or more data sources further comprises:

identifying, using the artificial intelligence model, a set of fact points about a known user, generating, by the artificial intelligence model using the identified set of fact points about the known user, an authentication question, wherein the identified set of facts points about the known user constitutes a correct response to the authentication question;

based on the comparison, assign, using the artificial intelligence model, a risk score associated with the entity, wherein the risk score determines a presence of potential unauthorized activity associated with the entity;

receive feedback data on the risk score assigned by the artificial intelligence model; and automatically and continuously update, based on the feedback data, the artificial intelligence model.

16. The one or more non-transitory computer-readable media of claim 15, wherein comparing, using the artificial intelligence model, the data from the received input with the identity information from the one or more data sources further comprises:

transmitting the authentication question to a computing device associated with the entity;

receiving, from the computing device associated with the entity, response data responsive to the authentication question;

comparing the response data to the set of fact points about the known user; and based on matching the set of fact points about the known user to the response data, authenticating the entity.

17. The one or more non-transitory computer-readable media of claim 15, wherein the instructions, when executed by the computing platform, further cause the computing platform to:

retrieve a predetermined threshold;

compare the risk score to the predetermined threshold; and based on the comparison, determine an occurrence of unauthorized activity associated with the entity when the risk score is above the predetermined threshold.

18. The one or more non-transitory computer-readable media of claim 15, wherein automatically and continuously updating the artificial intelligence model based on the feedback data comprises adjusting the risk score assigned by the artificial intelligence model based on the feedback data.

* * * * *